(12) United States Patent
Uehara (10) Patent No.: US 7,622,664 B2
(45) Date of Patent: Nov. 24, 2009

(54) PERFORMANCE CONTROL SYSTEM, PERFORMANCE CONTROL APPARATUS, PERFORMANCE CONTROL METHOD, PROGRAM FOR IMPLEMENTING THE METHOD, AND STORAGE MEDIUM STORING THE PROGRAM

(75) Inventor: Haruki Uehara, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 0 days.

(21) Appl. No.: 11/929,733

(22) Filed: Oct. 30, 2007

(65) Prior Publication Data

US 2008/0060503 A1 Mar. 13, 2008

Related U.S. Application Data

(62) Division of application No. 11/196,213, filed on Aug. 2, 2005, now Pat. No. 7,332,666.

(30) Foreign Application Priority Data

Aug. 5, 2004 (JP) ............... 2004-229424
Aug. 5, 2004 (JP) ............... 2004-229425

(51) Int. Cl.
*A63H 5/00* (2006.01)
*G04B 13/00* (2006.01)

(52) U.S. Cl. ............... 84/609; 84/612; 84/649; 84/652

(58) Field of Classification Search ............ None
See application file for complete search history.

(56) References Cited

U.S. PATENT DOCUMENTS

| 5,753,844 A | 5/1998 | Matsumoto |
| 5,915,288 A | 6/1999 | Gabriel |
| 5,982,980 A | 11/1999 | Tada |
| 6,989,485 B2 * | 1/2006 | Ochi ............ 84/645 |
| 7,026,537 B2 * | 4/2006 | Ishii ............ 84/617 |
| 7,332,666 B2 * | 2/2008 | Uehara ............ 84/609 |
| 2003/0110924 A1 * | 6/2003 | Miyamoto ............ 84/477 R |
| 2003/0133700 A1 | 7/2003 | Uehara |
| 2004/0011190 A1 * | 1/2004 | Kawashima ............ 84/645 |
| 2005/0150362 A1 * | 7/2005 | Uehara ............ 84/645 |
| 2006/0027079 A1 * | 2/2006 | Uehara ............ 84/609 |

FOREIGN PATENT DOCUMENTS

| JP | 03-034180 | 2/1991 |
| JP | 05-046172 | 2/1993 |
| JP | 6028781 | 2/1994 |
| JP | 6308954 | 11/1994 |
| JP | 7093958 | 4/1995 |
| JP | 7114787 | 5/1995 |

(Continued)

*Primary Examiner*—Marlon T Fletcher
(74) *Attorney, Agent, or Firm*—Morrison & Foerster LLP (57) ABSTRACT

A performance control apparatus which can actually reproduce performance information without a long sounding blank time period being produced even if the performance information includes information indicative of a long sounding blank time period. Performance data md-A including at least key-on event data KON and time data TIME that defines sounding timing is read out and output. When the time data TIME in the readout performance data md-A is indicative of a longer sounding blank time period than a predetermined time period, the sounding blank time period is reduced or eliminated in outputting the performance data md-A.

5 Claims, 10 Drawing Sheets

FOREIGN PATENT DOCUMENTS

| | | |
|---|---|---|
| JP | 07-199929 | 8/1995 |
| JP | 10-74092 | 3/1998 |
| JP | 2001236062 | 8/2001 |
| JP | 2003177748 | 6/2003 |
| JP | 2003-208169 | 7/2003 |
| JP | 2006066674 | 3/2006 |

* cited by examiner

PERFORMANCE CONTROL SYSTEM, PERFORMANCE CONTROL APPARATUS, PERFORMANCE CONTROL METHOD, PROGRAM FOR IMPLEMENTING THE METHOD, AND STORAGE MEDIUM STORING THE PROGRAM

CROSS-REFERENCE TO RELATED APPLICATIONS

This application is a division of U.S. patent application Ser. No. 11/196,213 filed Aug. 2, 2005, the entire disclosure of which is incorporated herein by reference.

BACKGROUND OF THE INVENTION

1. Field of the Invention

The present invention relates to a performance control system, a performance control apparatus, a performance control method, a program for implementing the method, and a storage medium storing the program. In particular, the present invention relates to a performance control apparatus that handles performance information including sounding instruction information and time information for defining sounding timing, as well as a program for implementing the method and a storage medium storing the program.

Also, the present invention particularly relates to a performance control system and a performance control method that reproduce serial information such as video data and performance information corresponding thereto in synchronism with each other as time passes, as well as a program for implementing the method, and a storage medium storing the program.

2. Description of the Related Art

Conventionally, a performance control apparatus such as a reproducing/recording apparatus disclosed in Japanese Laid-Open Patent Publication (Kokai) No. 2003-208169 has been known which is constructed such that image information and the corresponding performance information based on teacher's performance, which are recorded in recording media, are reproduced in synchronism with each other, for the purpose of practice for playing a musical instrument such as a piano, so that a user as a student can play a player piano or the like, while watching an image being reproduced and displayed and/or listening to reproduced tones of the performance information, and performance information (data conforming to MIDI (Musical Instruments Digital Interface) standards) corresponding to the user's performance can be recorded in a desired storage medium.

However, according to the performance control apparatus disclosed in Japanese Laid-Open Patent Publication (Kokai) No. 2003-208169 mentioned above, assuming that performance carried out by a student watching an image is recorded as performance information such as MIDI data, he/she usually does not play even at the leading end or in the middle of the image during narration such as a teacher's comment, although the performance information is being recorded. Thus, no sounding instruction information (sounding event) is recorded over a long period of time, and consequently, performance information that is recorded has a long "sounding blank time period" for which no tones are sounded.

In the case where the recorded performance information is reproduced, for example, independently of an image, no tones are sounded in the sounding blank time period, and hence there is a long time of silence. As a result, it is impossible to know whether or not performance information is being reproduced, and it takes a long time to reproduce one piece of performance information to the end even though the net performance time is short, which is very inconvenient.

Also, a synchronous performance control system for a karaoke machine, etc. as disclosed in Japanese Laid-Open Patent Publication (Kokai) No. H10-74092 has been conventionally known which reproduces performance data and image data in synchronism with each other. In this system, musical composition data and time-series image sequence data are stored in association with each other, and their relationship is managed by way of an index file. When musical composition data is reproduced, images are displayed in accordance with image sequence data associated with the musical composition data.

In the system disclosed in Japanese Laid-Open Patent Publication (Kokai) No. H10-74092 mentioned above, the management is easy to carry out because only one piece of musical composition data is associated with an image to be displayed, but for example, in the case where a plurality of pieces of performance information are associated with serial information such as video data to be reproduced as time passes, and the performance information changes as time passes, the management is difficult to carry out. Also, in the case where reproduction of the serial information mentioned above is started in the middle, it is difficult to synchronize the serial information and performance information by starting reproducing the performance information at the corresponding position in the middle.

SUMMARY OF THE INVENTION

It is a first object of the present invention to provide a performance control apparatus and a performance control method which can actually reproduce performance information without a long sounding blank time period being produced even if the performance information includes information indicative of a long sounding blank time period, as well as a program for implementing the method and a storage medium storing the program.

It is a second object of the present invention to provide a performance control system and a performance control method which can reproduce serial information and performance information corresponding thereto in synchronism with each other from arbitrary temporal positions of the serial information and the performance information by easy management, as well as a program for implementing the method and a storage medium storing the program.

To attain the first object, in a first aspect of the present invention, there is provided a performance control apparatus comprising a performance information readout device that reads out performance information including at least sounding instruction information, and time information that defines sounding timing, and a performance information output control device that outputs the performance information read out by the performance information readout device, wherein the performance information output control device is operable when the time information in the readout performance information is indicative of a longer sounding blank time period than a predetermined time period, to provide control such that reduction or elimination of the sounding blank time period is carried out in outputting the performance information.

Preferably, the performance information output control device converts the sounding blank time period into a time period equal to or shorter than the predetermined time period in outputting the performance information.

Also preferably, the performance information output control device deletes the time information indicative of the sounding blank time period from the readout performance information, updates the readout performance information to new performance information with the time information indicative of the sounding blank time period deleted, and outputs the new performance information.

To attain the first object, in a second aspect of the present invention, there is provided a performance control program for causing a computer to execute a performance control method, comprising a performance information readout module for reading out performance information including at least sounding instruction information and time information that defines sounding timing, and a performance information output control module for outputting the performance information read out by the performance information readout module, wherein the performance information output control module is operable when the time information in the readout performance information is indicative of a longer sounding blank time period than a predetermined time period, for providing control such that reduction or elimination of the sounding blank time period is carried out in outputting the performance information.

To attain the first object, in a third aspect of the present invention, there is provided a computer-readable storage medium containing a performance control program for causing a computer to execute a performance control method, the program comprising a performance information readout module for reading out performance information including at least sounding instruction information and time information that defines sounding timing, and a performance information output control module for outputting the performance information read out by the performance information readout module, wherein the performance information output control module is operable when the time information in the readout performance information is indicative of a longer sounding blank time period than a predetermined time period, for providing control such that reduction or elimination of the sounding blank time period is carried out in outputting the performance information.

To attain the second object, in a fourth aspect of the present invention, there is provided a performance control system comprising a serial information storage device that stores serial information reproducible as time passes, a performance information storage device that stores performance information corresponding to the serial information, a serial information reproducing device that reads out and reproduces the serial information stored by the serial information storage device as time passes, a performance information reproducing device that reads out and reproduces the performance information stored by the performance information storage device, and a reproduction control device that controls reproduction of the serial information by the serial information reproducing device and reproduction of the performance information by the performance information reproducing device, wherein the serial information comprises identifying information for identifying corresponding performance information, and time information that defines a temporal position for reproduction of the corresponding performance information in association with reproduction of the serial information, and the reproduction control device provides control such that performance information identified by the identifying information in the serial information read out by the serial information reproducing device is reproduced based on the time information in the serial information read out by the serial information reproducing device.

Preferably, the serial information comprises audio information, and the serial information storage device stores the identifying information and the time information using an audio signal channel in the audio information.

To attain the second object, in a fifth aspect of the present invention, there is provided a performance control method comprising a serial information reproducing step of reading out and reproducing stored serial information reproducible as time passes, as time passes, a performance information reproducing step of reading out and reproducing stored performance information corresponding to the serial information, and a reproduction control step of controlling reproduction of the serial information in the serial information reproducing step and reproduction of the performance information in the performance information reproducing step, wherein the serial information comprises identifying information for identifying corresponding performance information, and time information that defines a temporal position for reproduction of the corresponding performance information in association with reproduction of the serial information, and the reproduction control step comprises providing control such that performance information identified by the identifying information in the serial information read out in the serial information reproducing step is reproduced based on the time information in the serial information read out in the serial information reproducing step.

To attain the second object, in a sixth aspect of the present invention, there is provided a program for causing a computer to execute a performance control method, comprising a serial information reproducing module for reading out and reproducing stored serial information reproducible as time passes, as time passes, a performance information reproducing module for reading out and reproducing stored performance information corresponding to the serial information, and a reproduction control module for controlling reproduction of the serial information by the serial information reproducing module and reproduction of the performance information by the performance information reproducing module, wherein the serial information comprises identifying information for identifying corresponding performance information, and time information that defines a temporal position for reproduction of the corresponding performance information in association with reproduction of the serial information, and the reproduction control module provides control such that performance information identified by the identifying information in the serial information read out by the serial information reproducing module is reproduced based on the time information in the serial information read out by the serial information reproducing module.

To attain the second object, in a seventh aspect of the present invention, there is provided a computer-readable storage medium storing a program for causing a computer to execute a performance control method, the program comprising a serial information reproducing module for reading out and reproducing stored serial information reproducible as time passes, as time passes, a performance information reproducing module for reading out and reproducing stored performance information corresponding to the serial information, and a reproduction control module for controlling reproduction of the serial information by the serial information reproducing module and reproduction of the performance information by the performance information reproducing module, wherein the serial information comprises identifying information for identifying corresponding performance information, and time information that defines a temporal position for reproduction of the corresponding performance information in association with reproduction of the serial information, and the reproduction control module provides control such that performance information identified by the identifying information in the serial information read out by the serial information reproducing module is reproduced based on the time information in the serial information read out by the serial information reproducing module.

According to the first aspect of the present invention, even performance information including information indicative of a long sounding blank time period can be actually reproduced without a long sounding blank time period being produced.

According to the second aspect of the present invention, serial information and performance information corresponding thereto can be reproduced in synchronism with each other from arbitrary temporal positions of the serial information and the performance information by easy management.

The above and other objects, features, and advantages of the invention will become more apparent from the following detained description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
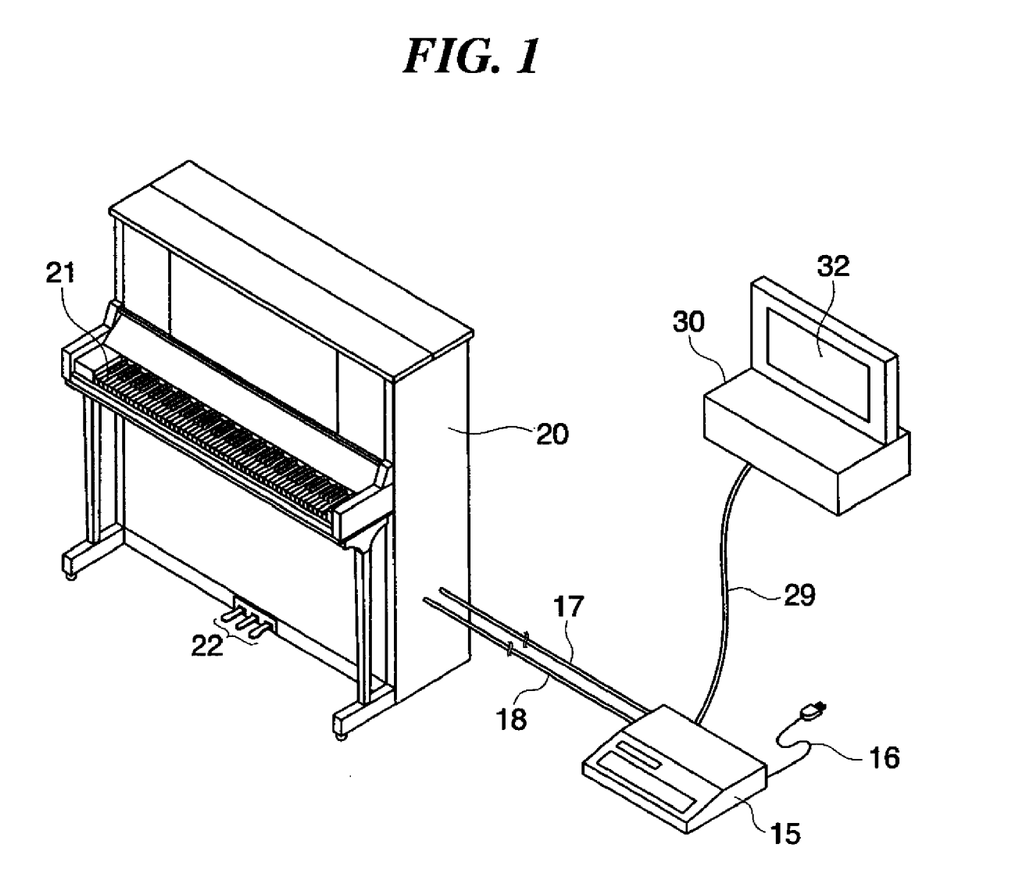
FIG. 1 is a perspective view showing the overall arrangement of a performance control system including a performance control apparatus according to an embodiment of the present invention.

FIG. 1 is a perspective view showing the overall arrangement of a performance control system including a performance control apparatus according to an embodiment of the present invention. The performance control system is comprised of the performance control apparatus 15, a player piano 20, and a video apparatus 30. A power cable 16 is connected to the performance control apparatus 15. The performance control apparatus 15 and the player piano 20 are connected to each other via a MIDI (Musical Instrument Digital Interface) signal cable 17 so that they communicate with each other, and also, they are connected to each other via a power cable 18. The player piano 20 is an electronic keyboard instrument comprised of a keyboard 21, pedals 22, and so forth. The video apparatus 30 has a display 32, and is connected to the performance control apparatus 15 via a composite cable 29. It should be noted that the MIDI signal cable 17 and the composite cable 29 are only illustrative, and other communication means such as wireless means may be used.

Figure 2:
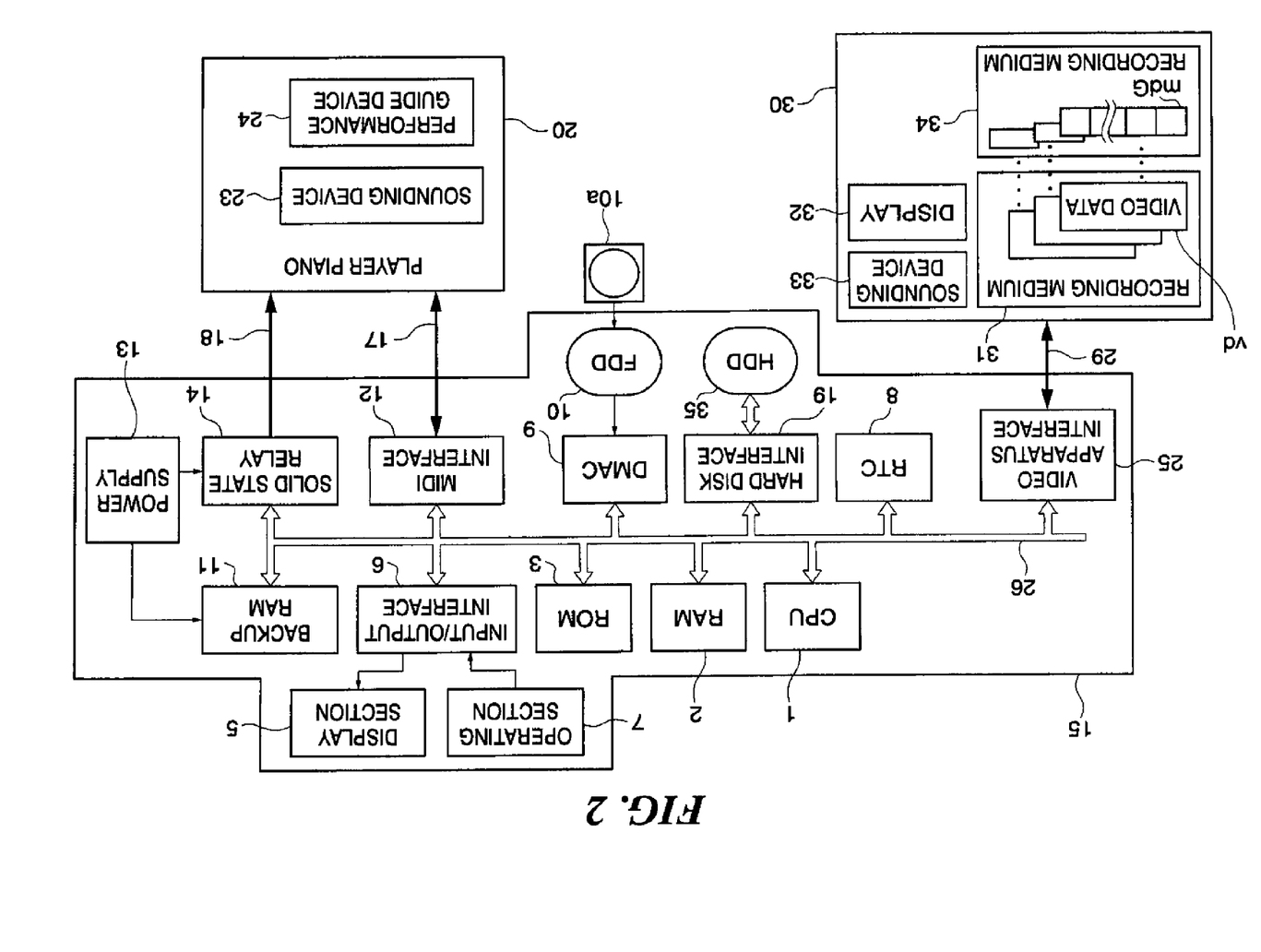
FIG. 2 is a block diagram showing the overall arrangement of the performance control system in FIG. 1.

FIG. 2 is a block diagram showing the overall arrangement of the performance control system.

The performance control apparatus 15 is comprised of a RAM 2, a ROM 3, an input/output interface 6, a backup RAM 11, a solid state relay 14, a MIDI interface 12, a DMAC (Direct Memory Access Clock) 9, a hard disk interface 19, a RTC (real-time clock) 8, and a video apparatus interface 25, which are connected to a CPU 1 via a bus 26.

The CPU 1 controls the overall operation of the performance control apparatus 15. The RAM 2 temporarily stores various input information such as performance information and text information, various flags, buffer data, computation results, etc. The ROM 3 stores control programs executed by the CPU 1, various table data, etc. A display section 5 and an operating section 7 are connected to the input/output interface 6. The display section 5 is implemented by a liquid crystal display (LCD) or the like, for displaying various kinds of information such as data, messages, and musical scores stored in the RAM 2. The operating section 7 is used to input various instructions to the performance control apparatus 15.

The RTC 8 measures an interrupt time for timer interrupt processing and various kinds of time. The DMAC 9 reads data stored in a floppy (registered trademark) disk 10a into the RAM 2 via a floppy (registered trademark) disk drive 10. The MIDI interface 12 enables transmission of MIDI signals from the performance control apparatus 15 to the player piano 20 via the MIDI signal cable 17 and vice versa. A power supply 13 supplies power to the entire performance control apparatus 15. The power supply 13 also supplies power to the player piano 20 via the solid state relay 14 and the power cable 18. The solid state relay 14 is turned on or off in accordance with an instruction output from the CPU 1 at a predetermined time or hour. The hard disk interface 19 enables a hard disk (HDD) 35 to store various supplied data such as performance data.

The composite cable 29 is connected to the video apparatus interface 25, for enabling transmission of video signals, audio signals, and MIDI signals from the player piano 20 to the video apparatus 30 and vice versa.

The video apparatus 30 is comprised of a recording medium 31 such as a DVD or a video tape, a recording medium 34 such as a flash memory, and a sounding device 33, as well as the above-mentioned display 32. The recording medium 31 stores a plurality of pieces of video data vd including image data and audio data, and the recording medium 34 stores MIDI performance data groups mdG associated with the respective pieces of video data vd. The display 32 is capable of displaying images based on image data in the video data vd, and the sounding device 33 is capable of generating musical tones based on audio data in the video data vd.

The player piano 20 is comprised of a sounding device 23, and a performance guide device 24. The sounding device 23 includes a tone generator circuit, effect circuit, and sound system, which are not shown. The sounding device 23 generates in real time performance tones produced by the keyboard 21, and drives keyboard driving solenoids, not shown, provided in respective keys according to performance data to generate automatic performance tones in accordance with the performance data. The performance guide device 24, which lights up the keys of the keyboard 21 according to performance data, can be used for performance lessons. It should be noted that the player piano 20 detects operation of the keyboard 21 and the pedals 22 by the player so that the performance control apparatus 15 can generate performance data based on the detected operation.

Figure 3:
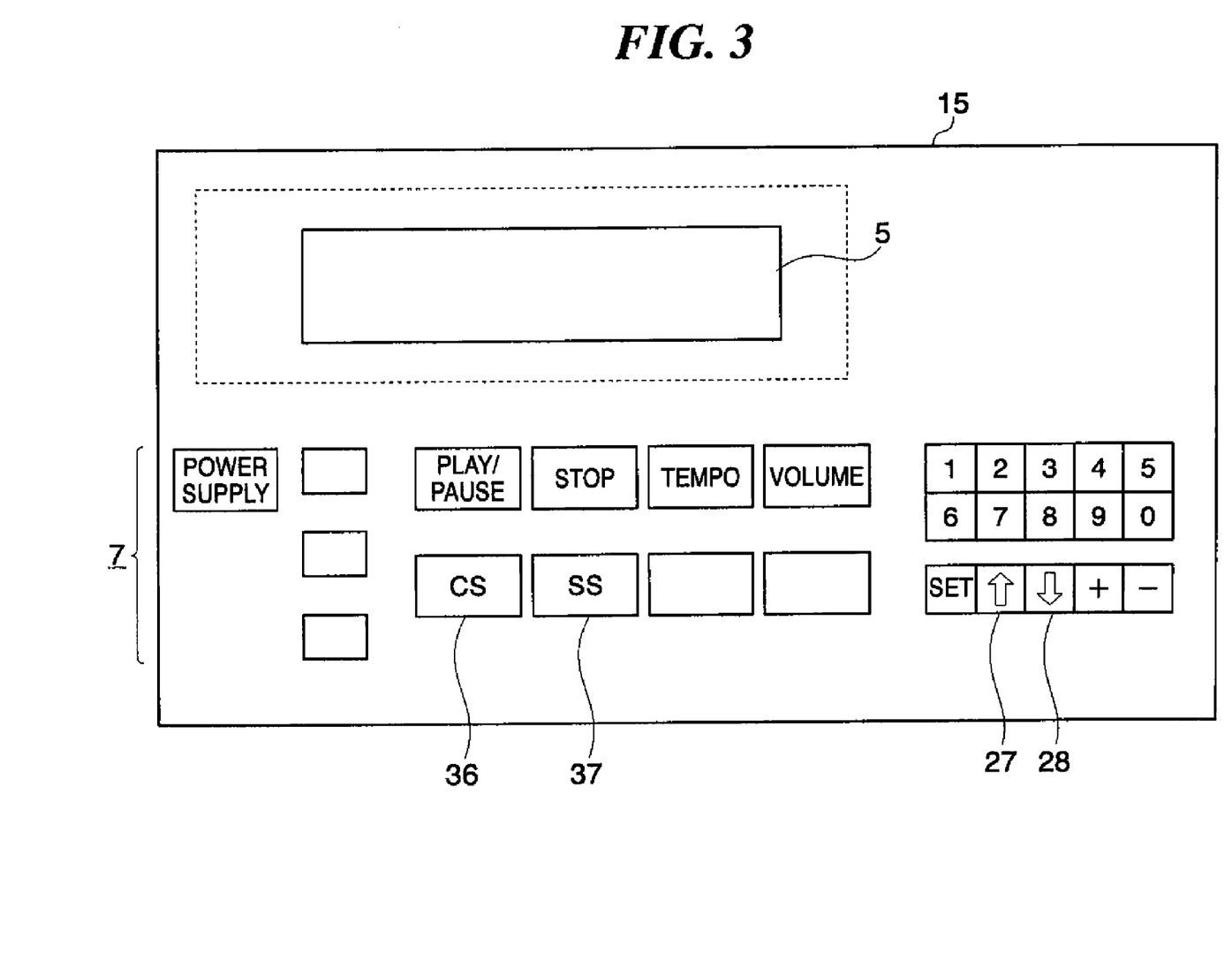
FIG. 3 is a plan view showing an operating panel of the performance control apparatus of the performance control system.

FIG. 3 is a plan view showing an operating panel of the performance control apparatus 15. The operating panel is comprised of the display section 5 and the operating section 7.

The operating section 7 is comprised of various function keys such as a power key, a PLAY/PAUSE key, a STOP key, a CS (Cancel Space) key 36, an SS (Skip Space) key 37, an UP cursor key 27, and a DOWN cursor key 28.

Figure 4:
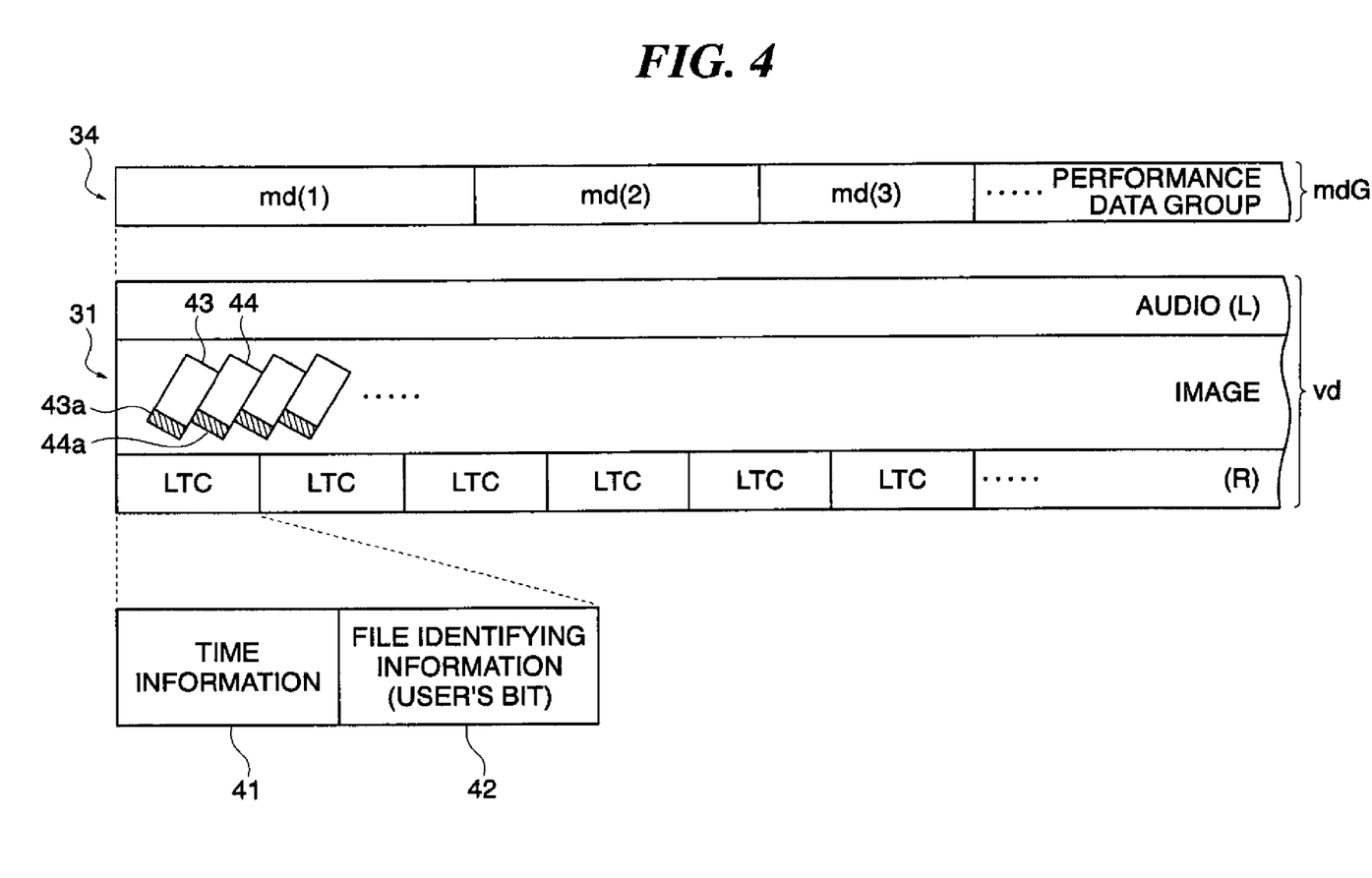
FIG. 4 is a conceptual diagram showing video data and performance data groups stored in recording media appearing in FIG. 2.

FIG. 4 is a conceptual diagram showing the structure of the video data vd and performance data groups mdG stored in the recording media 31 and 34, respectively.

The video data vd is comprised of shot images which represent teacher's performance scenes (e.g. the movement of fingers on the keyboard 21) and narration voice such as teacher's comments, which have been recorded and shot for teaching or the like. Each performance data group mdG, which represents e.g. exemplary performance to be reproduced in synchronism with reproduction of video data vd, is recorded in the MIDI format. There may be a case where performance data groups mdG created separately are associated with video data vd afterward, as well as a case where teacher's performance is converted into data in parallel with shooting of teacher's performance scene mentioned above so that video data vd and performance data groups mdG are associated with each other and recorded in real time. The performance data groups mdG can also be used to guide performance in the player piano 20.

As shown in FIG. 4, the recording medium 31 is comprised of an image track and two-channel (L/R) audio tracks; image data in the video data vd is recorded in the image track. The image data has such an ordinary structure that one frame is formed by two tracks; for example, image data of one frame is recorded in a first track 43 and a second track 44. The audio data is recorded in an ordinary form in only one audio signal channel such as the L-channel, but is not recorded in the other channel such as the R-channel. A large number of LTCs, described later, are recorded in the R-channel at regular time intervals (e.g. 30 ms).

On the other hand, performance data groups mdG in association with the video data vd are stored in the recording medium 34. In the present embodiment, a plurality of pieces of performance data such as performance data md(1), md(2), md(3), ... in each performance data group mdG are associated with the video data vd, but only one piece of performance data may be associated with the video data vd. In the following description, each piece of performance data will be referred to as "performance data md." "Music information" comprised of various information such as file name, data capacity, tempo, beat, and corresponding or related image title is added to each piece of performance data md and stored together with the performance data md. The information indicative of file name is unique information which varies depending on performance data md, and, for example, includes information indicative of a device in which the concerned performance data md is recorded, and a recording start time.

In FIG. 4, the performance data md to be reproduced in association with serial reproduction of the video data vd are shown in time-series, but in actuality, each piece of the performance data md itself includes no information indicative of a reproduction start time. Therefore, it is necessary to obtain the relationship between the performance data md and the video data vd in one way or another so that the performance data md and the video data vd can be reproduced in synchronism with each other. This is realized by the LTCs.

The LTC, which is an SMTPE (Society of Motion Picture and Television Engineers) time code (Longitudinal Time Code), is comprised of time information 41 and file identifying information 42 stored in a user's bit, as shown in FIG. 4. A database in which the file identifying information 42 is in one-to-one correspondence to the performance data md is stored in advance in the hard disk 35 of the performance control apparatus 15, and one piece of the performance data md is identified by the file identifying information 42. For example, a plurality of combinations of the file identifying information 42 and a file name of the corresponding performance data md are registered in the database. Specifically, in serial reproduction of video data vd, each time an LTC is read out, the performance control apparatus 15 identifies performance data md corresponding to the file identifying information 42 in the LTC by referring to the database, and regards the identified performance data md as "performance data to be reproduced", which should be reproduced in timing in which the LTC is read out.

On the other hand, the time information 41 is information that designates a time (absolute time) from the leading end of video data vd being reproduced in series, and includes information indicative of time, minutes, and seconds associated with each frame of image data. The time information 41 defines a temporal position in the "performance data to be reproduced" at which reproduction of the "performance data to be reproduced" should be started in timing in which the concerned LTC or time information 41 is read out. As a result, in reproduction of video data vd, reproduction of the corresponding performance data md can be synchronized with reproduction of the video data vd.

It should be noted that user's bits of two LTCs adjacent to each other in terms of time may be regarded as one set, and two LTCs including one set of user's bits may define the corresponding performance data md and reproduction timing thereof. In this case, assuming that the user's bit of one LTC is comprised of 32-bit data, one bit of 32 bits may be used to discriminate whether the concerned LTC is a front one or a rear one in one set.

Taking an example where the performance control system according to the present embodiment is used for teaching, the student sits in front of the player piano 20 and places the video apparatus 30 so that he or she can see the display 32. Then, the student causes the video apparatus 30 to start reproducing video data vd. Then, image data in the image track of the video data vd is displayed on the display 32, and audio data (L-channel data in the example of FIG. 4) in the audio track of the video data vd is sounded from the sounding device 33. The student practices while watching the image data and listening to the audio data. Further, signals in the audio track are sent to the performance control apparatus 15 via the composite cable 29 to separate LTCs from the signals. In synchronism with the reproduction of the video data vd, the corresponding performance data md are read out from the storage medium 31 of the video apparatus 30 by a process, described later, and the read data are subjected to predetermined processing, described later, and then sent to the player piano 20. As a result, musical tones are sounded from the sounding device 23 of the player piano 20, and performance guide by the performance guide device 24 is provided in a certain mode.

It should be noted that when video data vd is reproduced, image data in the video data vd as well may be sent form the video apparatus 30 to the performance control apparatus 15, and also, the image data may be displayed in the display section 5 of the performance control apparatus 15. Also, the performance control apparatus 15 may be provided with a sounding device so that audio data and performance data md can be sounded. Alternatively, it may be configured such that image data and audio data can be transmitted from the performance control apparatus 15 to the player piano 20 and vice versa; the performance control apparatus 15 may transmit image data and audio data received from the video apparatus 30 to the player piano 20, and the player piano 20 may display and reproduce video data vd.

Figure 5:
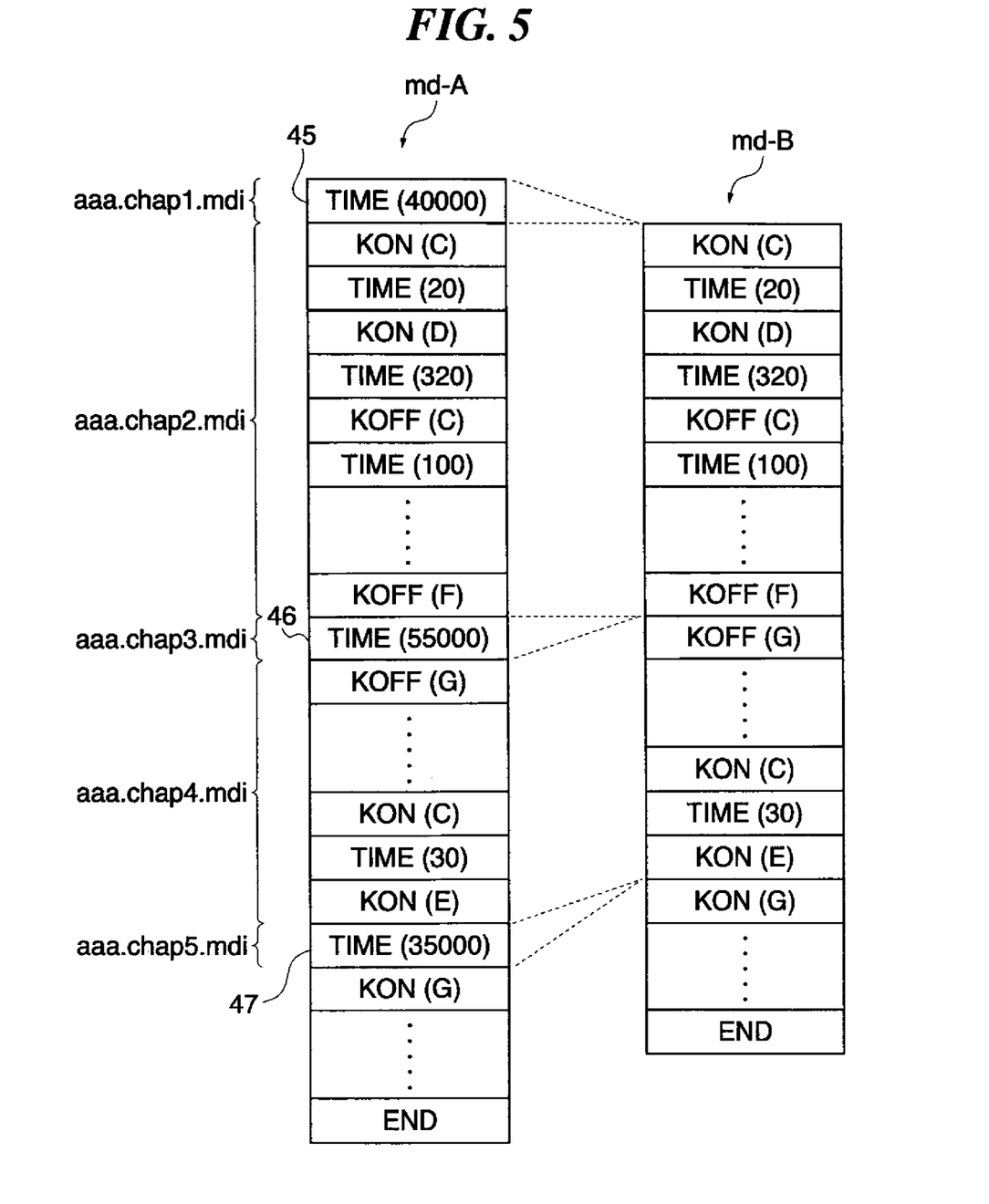
FIG. 5 is a conceptual diagram showing the structure of a piece of performance data in the performance data groups shown in FIG. 4.

FIG. 5 is a conceptual diagram showing the structure of a piece of performance data md. To discriminate between states before and after a converting process in FIG. 7, described later, original performance data md-A and performance data md-B on which the converting process has been carried out are shown in parallel with each other.

The performance data md-A is comprised of a sequence data stream including a plurality of pieces of event data (key-on event data KON (sounding instruction information) and key-off event data KOFF), a plurality of pieces of timing data TIME, and one piece of end data END placed at the end. Each piece of event data is comprised of data indicative of pitch, data which instructs sounding/sound-deadening, and data indicative of velocity, none of which are shown. Each piece of timing data TIME defines readout timing in which event data positioned immediately after the timing data TIME is read out. The performance data md-A differs from ordinary performance data only in that some pieces of the timing data TIME define a very long time interval as long as 30,000 msec or longer (TIME 45, TIME 46, and TIME 47 in FIG. 5). Such a very long time interval corresponds to a period of time for which a comment on performance or teaching is given only by voice in video data and automatic performance is not carried out.

Figure 6:
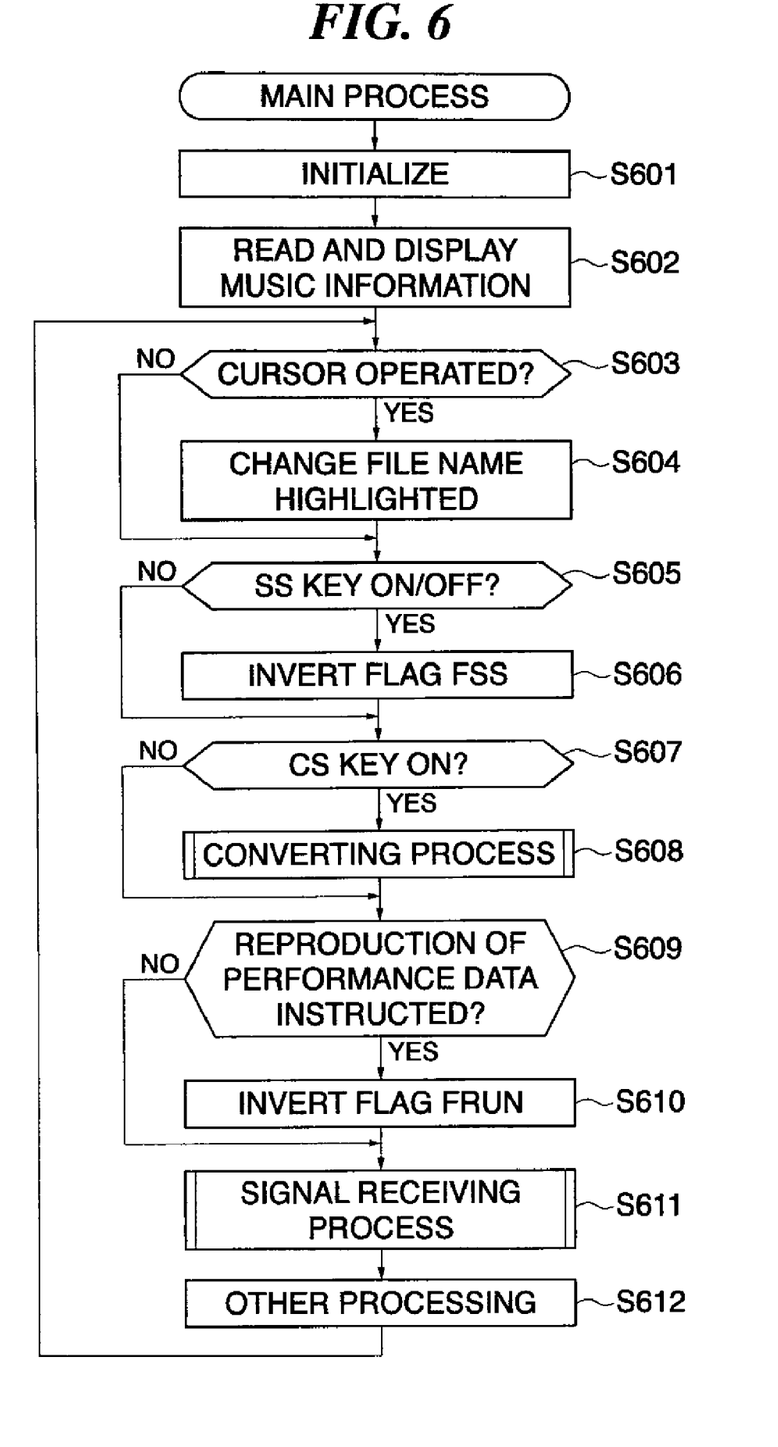
FIG. 6 is a flow chart showing a main process carried out by a CPU of the performance control apparatus appearing in FIG. 2.

FIG. 6 is a flow chart showing a main process carried out by the CPU 1 of the performance control apparatus 15.

First, initialization, i.e. execution of a predetermined program is started to clear various registers, flags, parameters, timers, and so forth (step S601). Then, music information in all the pieces of performance data md is read from the recording medium 34 and displayed in the display section 5 (step S602). Here, at least file names in the music information are displayed and arranged vertically from the top to the bottom in a list, for example. Initially, a file name located at the top is highlighted, and performance data md corresponding to this file name is selected as the object to be reproduced.

Then, when operation of the UP/DOWN cursor keys 27 and/or 28 is input, an upper or a lower file name is highlighted according to the operation, to select desired performance data md (steps S603 and S604). Then, when the SS key 37 is turned on or off, a skip space execution flag FSS is inverted from "0" to "1" or vice versa in response to turning-on/off of the SS key 37 (steps S605 and S606). When the CS key 36 is turned on, the converting process in FIG. 7, described later, is carried out on the currently selected performance data md (steps S607 and S608). Then, when a performance data reproducing instruction is received, a reproduction execution flag FRUN is inverted from "0" to "1" (steps S609 and S610). Then, a signal receiving process in FIGS. 9A and 9B, described later, is carried out (step S611), and other processing is performed (step S612). The process then returns to the step S603.

Figure 7:
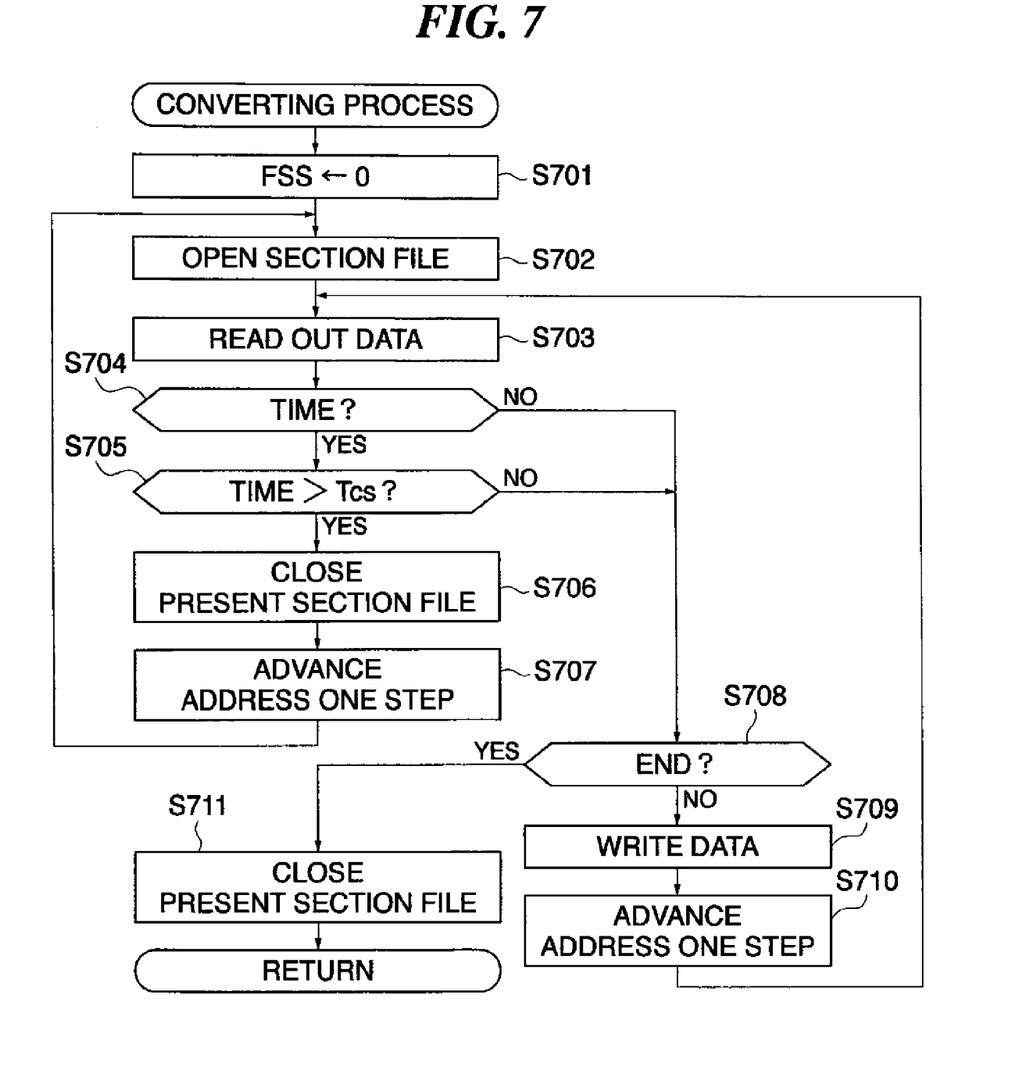
FIG. 7 is a flow chart showing a converting process carried out in a step S608 in FIG. 6.

FIG. 7 is a flow chart showing the converting process carried out in the step S608 in FIG. 6. The converting process is comprised mainly of a process in which data included in the performance data selected as the object to be reproduced (performance data md-A in the example shown in FIG. 5) are sequentially read out, and section files each of which is a group of data delimited by adjacent pieces of timing data TIME are written one upon another to generate new performance data (performance data md-B in the example shown in FIG. 5) (step S709→S710→S703). Then, when timing data TIME is indicative of a longer time period than a predetermined time period Tcs (e.g. 30,000 msec), the timing data TIME is deleted without writing the corresponding section file to generate new performance data md-B (step S705→S706→S707→S702).

First, the skip space execution flag FSS is set to "0" (step S701), and a first section file is opened (step S702). Then, data in the performance data md is read out from the position indicated by an address pointer (step S703), and it is determined whether or not the read data is timing data TIME (step S704). If the read data is timing data TIME, it is determined whether or not the timing data TIME is indicative of a longer time period than the predetermined time period Tcs (step S705). If the timing data TIMS is indicative of a longer time period than the predetermined time period Tcs, the currently opened file is closed (step S706), and the address is advanced one step (S707).

In the example shown in FIG. 5, since initially the address pointer is positioned at the leading end of the performance data md-A, timing data TIME 45 is included in the first section file (referred to as "aaa.chap1.mdi") opened first. Since the timing data TIME 45 is indicative of a time period of "40000 msec", which is longer than the predetermined time period Tcs, aaa.chap1.mdi is immediately closed. As a result, the timing data TIME 45 is substantially canceled. It should be noted that the character string "aaa" designate an example of file name. After the execution of the step S707, the process returns to the step S702 wherein a second section file (aaa.chap2.mdi) is newly opened, and the step S703 and the subsequent steps are executed in the above-described manner.

Then, in the step S704 or S705, if the data that has been read out this time is not timing data TIME, or is timing data TIME but is not longer than the predetermined time period Tcs, it is then determined whether or not the data that has been read out this time is end data END (step S708). If the data read out this time is not end data END, it is written as sequence data in the new performance data md-B (step S709), and the address is advanced one step (step S710). The process then returns to the step S703.

In the example shown in FIG. 5, since event data KON(C) is read out from the second section file (aaa.chap2.mdi), the process proceeds to the steps S704, S708, and S709 in this order, so that the event data KON(C) is written into the new performance data md-B. In the next loop, timing data TIME (20 msec) is read out. Since the timing data TIME (20 msec) is indicative of a time period not longer than the predetermined time period Tcs, the process proceeds to the steps S705, S708, and S709 in this order, and the timing data TIME (20 msec) is written as it is. This sequence is repeated, and when timing data TIME 46 is read out, the second section file (aaa.chap2.mdi) is closed since the timing data TIME 46 is indicative of a time period of 55,000 msec, which is longer than the predetermined time period Tcs (step S705→S706). Then, a third section file (aaa.chap3.mdi) is opened in the step S702. The above sequence is repeated until the end data END is read out. When the end data END is read out, the section file that is currently opened is closed (step S711), followed by termination of the process.

By the above described process, the new performance data md-B is generated by deleting (or ignoring) timing data TIME longer than the predetermined time period Tcs from the selected original performance data md-A (see FIG. 5). The performance data md-B is regarded as performance data md to be actually reproduced in place of the original performance data md-A. That is, the performance data md is updated.

Figure 8:
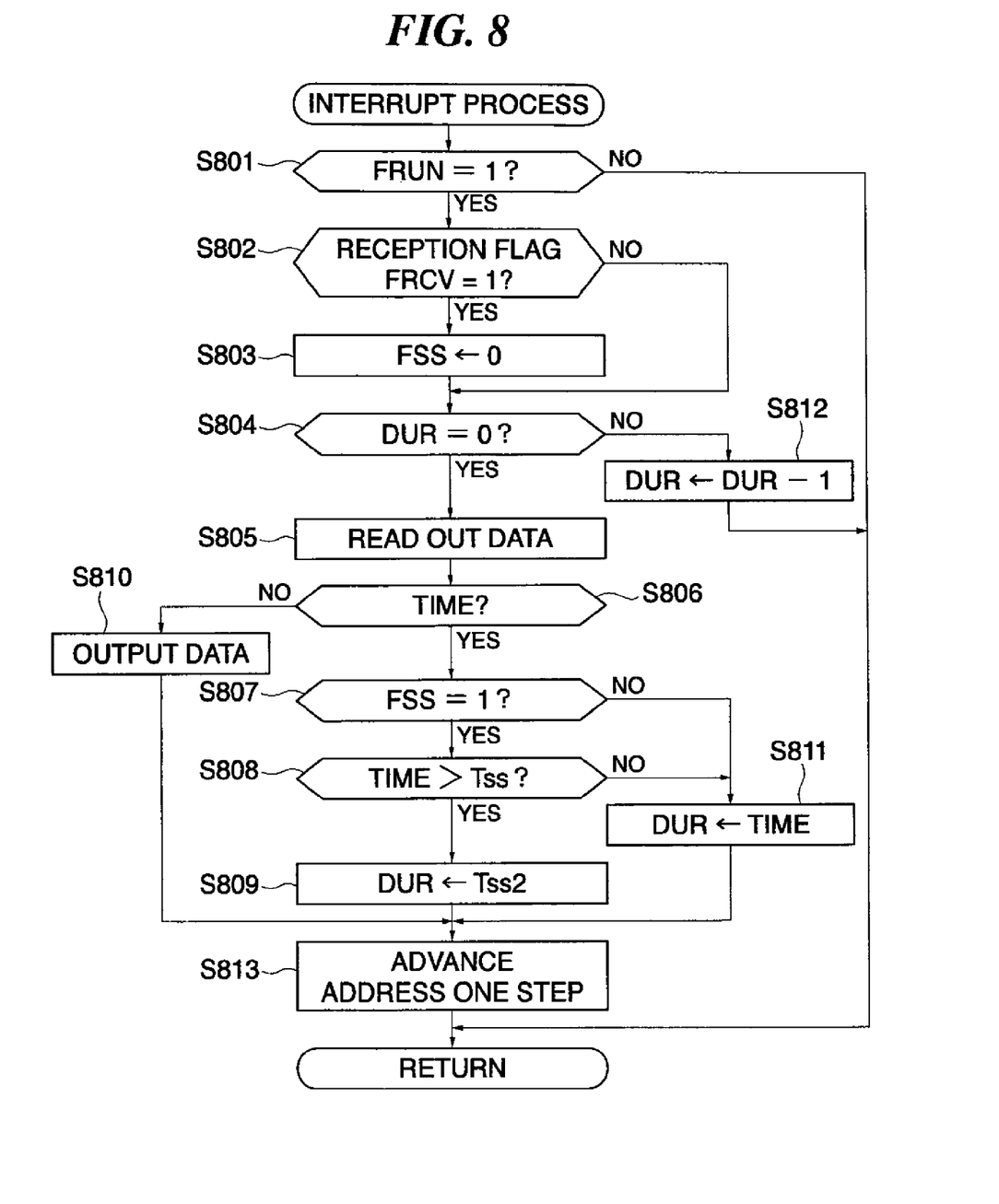
FIG. 8 is a flow chart showing a timer interrupt process.

FIG. 8 is a flow chart showing an interrupt process carried out at regular time intervals. The interrupt process is comprised mainly of a process in which data in performance data md to be reproduced are sequentially read out, and event data are sequentially output to the sounding device 23 of the player piano 20 to generate musical tones (step S810). On this occasion, when timing data TIME which is indicative of a shorter time period than a predetermined time period Tss (e.g. 30,000 msec) is read out, a time period corresponding thereto is provided as a wait time period until the next event data is output (steps S811, S804, and S812). If the timing data TIME is indicative of a longer time period than the predetermined time period Tss, the time period before the next event data is output is corrected to a shorter time period (step S809).

First, it is determined whether or not the reproduction execution flag FRUN is set to "1" (step S801). If the flag FRUN is set to "0", the process is terminated. On the other hand, if the flag FRUN is set to "1", it is determined whether or not a reception flag FRCV which indicates that signals in the audio track of video data vd have been received from the video apparatus 30 by "1" is set to "1" (step S802). Then, only when the flag FRCV is set to "1", the skip space execution flag FSS is set to "0" (step S803), and it is determined whether or not a counter DUR indicative of the duration, to which a value is set in the step S809 or S811 is set to "0" (step S804), and a process in which the counter DUR is incremented by 1 (step S812) is repeated until the counter DUR becomes equal to "0". When the counter DUR becomes equal to "0", data on the position indicated by the address pointer in the performance data md to be reproduced is read out (step S805).

Next, if the data which has been read out this time is not timing data TIME, the present event data such as key-on event data is output to the sounding device 23 of the player piano 20 (steps S806 and S810). As a result, musical tones are sequentially sounded from the sounding device 23. On the other hand, if the data which has been read out this time is timing data TIME, it is determined whether or not the flag FSS is set to "1" (step S807). If the flag FSS is set to "1", it is determined whether or not the timing data TIME is indicative of a longer time period than the predetermined time period Tss (step S808).

If it is determined that the flag FSS is set to "0" or the timing data TIME is indicative of a time period not longer than the predetermined time period Tss, the value of the timing data TIME is set to the counter DUR (step S811). On the other hand, if the timing data TIME is indicative of a longer time period than the predetermined time period Tss, a predetermined time period Tss2 (e.g. 3,000 msec) which is much shorter than the predetermined time period Tss is set to the counter DUR (step S809). As a result, in reproducing processing on performance data md(n), timing data TIME longer than the predetermined time period Tss is processed as timing data indicative of the shorter predetermined time period Tss2, and hence generation of a very long time period of silence can be prevented.

After the execution of the step S810, S809, or S811, the address is advanced one step (step S813), and the process is terminated.

Taking an example where performance data md to be reproduced is the performance data md-A appearing in FIG. 5, each piece of timing data TIME is reflected upon the counter value DUR with its length unchanged if it is indicative of a not longer time period than the predetermined time period Tss, but the timing data TIME 45, TIME 46, and TIME 47 longer than the predetermined time period Tss are reflected upon the counter value DUR with their lengths corrected to the shorter predetermined time period Tss2

By the way, the process in FIG. 8 realizes reproduction of performance data md not only when desired performance data md alone is reproduced, but also when performance data md is reproduced in synchronism with video data vd.

Figure 9A:
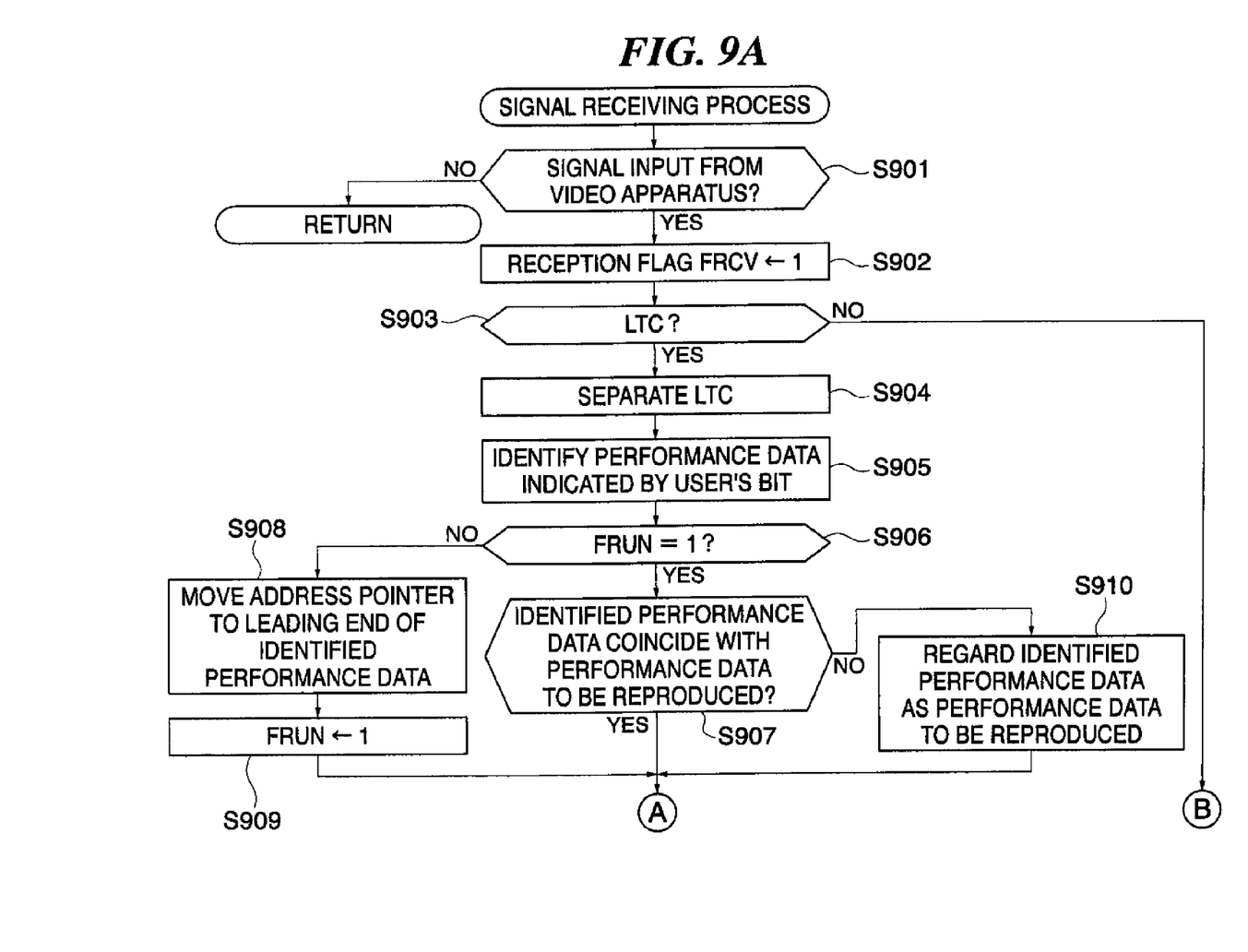
FIGS. 9A and 9B are flow charts showing a signal receiving process carried out in a step S611 in FIG. 6.
Figure 9B:
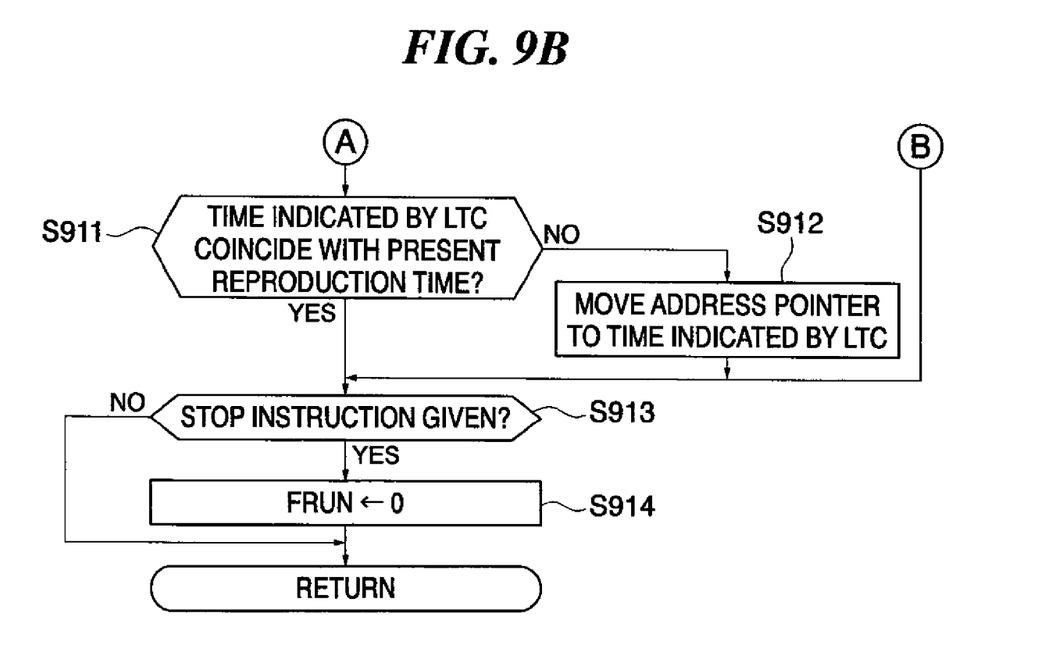

FIGS. 9A and 9B are flow charts showing the signal receiving process carried out in the step S611 in FIG. 6.

The signal receiving process is comprised mainly of a process in which performance data is identified based on LTCs (steps S903 to S905), a process in which the identified performance data is caused to coincide with performance data to be reproduced (steps S907 and S910), and a process in which reproduction timing of video data vd and reproduction timing of the performance data are synchronized (steps S911 and S912).

First, input signals from the video apparatus 30 are monitored, and when reproduction of video data vd starts in the video apparatus 30, and signals in the audio track of the video data vd are received via the video apparatus interface 25 (step S901), the process proceeds to a step S902.

In the step S902, the reception flag FRCV is set to "1", and if there is any LTC in the received signals, it is separated from the received signals (steps S903 and S904). Performance data md corresponding to the file identifying information 42 stored in the user's bit of the separated LTC is identified from among all the pieces of performance data md in all the performance data groups mdG stored in the recording medium 34 (step S905).

Next, when the reproduction execution flag FRUN is not set to "1" (step S906), the address pointer is placed at the leading end of the identified performance data md, and then the flag FRUN is set to "1" to thereby prepare for reproduction in the next loop (steps S908 and S909). The process then proceeds to the step S911. On the other hand, if the flag FRUN is set to "1" (step S906), it is determined whether or not the identified performance data md coincides with performance data as the present object to be reproduced (step S907). If the identified performance data md does not coincide with performance data as the present object to be reproduced, the identified performance data md is set as the present "performance data to be reproduced" (step S910), and the process proceeds to the step S911.

In the step S911, it is determined whether or not the time indicated by the time information 41 in the separated LTC and the present reproduction time (position indicated by the address pointer) in the performance data md as the present object to be reproduced coincide with each other. If they do not coincide with each other, the position of the address pointer in the performance data md is shifted in accordance with the time indicated by the time information 41 (step S912).

Then, the above sequence is repeated until a stop instruction is given. In response to the stop instruction (step S913), the flag FRUN is set to "0" (step S914), and the process is terminated.

According to the present embodiment, when timing data TIME in performance data md is indicative of a longer sounding blank time period than the predetermined time period Tss or the predetermined time period Tcs, the timing data TIME is shortened or deleted before the performance data md is reproduced. Therefore, even if performance data md has a long sounding blank time period, the performance data md can be reproduced without a long sounding blank time period being produced. As a result, it is possible to eliminate inconveniences that whether or not performance data md is being reproduced cannot be known, and that it takes an excessively long time to reproduce performance data md to the end.

Also, according to the present embodiment, LTCs are recorded at regular time intervals in one of the audio channels in video data vd, and when the video data vd is reproduced in series, performance data md to be reproduced is uniquely identified based on an LTC, and reproduction timing of the identified performance data md is defined based on the LTC. As a result, video data vd and performance data md corresponding thereto can be reproduced in synchronism with each other from arbitrary temporal positions by easy management. That is, even in the case where a plurality of pieces of performance data md are associated with one piece of video data vd and are different in reproduction timing from each other, management can be easy to carry out. Also, in the case where video data vd is reproduced from an arbitrary position in the middle, it is easy to accurately identify performance data md corresponding to the position and to accurately make the reproducing position of the identified performance data md coincide with that of the video data vd so that the performance data md and the video data vd can be reproduced in synchronism with each other. Also, since LTCs are stored using an audio signal channel in video data vd, the configuration can be simple and versatile.

It should be noted that the number of audio signal channels in video data vd may be three or more, and LTCs may be stored in two or more audio signal channels. Alternatively, LTCs may be recorded in an image track (for example, sections 43a and 44a of the first and second tracks 43 and 44 appearing in FIG. 4) not in an audio track.

Although in the present embodiment, video data vd and performance data md are reproduced in synchronism with each other, data reproduced in synchronism with the corresponding performance data md is not limited to video data vd with voice data, but may be audio data only or serial image data only insofar as it can be reproduced as time passes. In this case as well, a space track is provided to record LTCs therein as mentioned above, or audio or image data and LTCs are compressed and recorded in the same track.

It should be noted that the values of the predetermined time periods Tcs, Tss, and Tss2 are not limited to those mentioned above, but may be arbitrarily determined. In particular, the predetermined time period Tss2 has only to be shorter than the predetermined time period Tss and may be set to "0". Also, although in the converting process in FIG. 7, timing data TIME longer than the predetermined time period Tcs is deleted, it may be converted into data indicative of a shorter time period (e.g. a time period equal to the predetermined time period Tss2) than the predetermined time period Tcs and written into new performance data md.

It should be noted that the composite cable 29 and the video apparatus interface 25 may be configured such that the player piano 20 can receive at least MIDI signals insofar as the player piano 20 alone reproduces performance data md stored in the recording medium 34.

Although in the present embodiment, video data vd and performance data groups mdG are stored in the video apparatus 30, the present invention is not limited to this, but they may be stored in any place the performance control apparatus 15 can access. For example, video data vd and performance data groups mdG may be stored in the performance control apparatus 15 itself. Also, video data vd and performance data groups mdG may be stored in different places; for example, video data vd may be stored in the video apparatus 30, and performance data groups mdG may be stored in the performance control apparatus 15.

Although in the present embodiment, the performance control system is comprised of the performance control apparatus 15, player piano 20, and video apparatus 30, which are configured as separate bodies, the present invention is not limited to this. For example, the performance control apparatus 15 and the player piano 20 may be configured as an integral unit, the player piano 20 and the video apparatus 30 may be configured as an integral unit, or the performance control apparatus 15, player piano 20, and video apparatus 30 may be configured as an integral unit.

It should be noted that new performance data recorded by a student playing the piano while listening to performance data reproduced in synchronism with video data vd may be associated with video data vd in place of the original performance data. In this case, the original performance data is deleted, and the file name of the original performance data is added to the new performance data. Alternatively, if the original performance data is kept with the new performance data, the file identifying information 42 in an LTC in video data vd may be updated to identify the new performance data.

It is to be understood that the object of the present invention may also be accomplished by supplying a system or an apparatus with a storage medium in which a program code of software, which realizes the functions of the above described embodiment is stored, and causing a computer (or the CPU 1 or MPU) of the system or apparatus to read out and execute the program code stored in the storage medium.

In this case, the program code itself read from the storage medium realizes the functions of the above described embodiment, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-R/RW, a DVD+RW, an NV-RAM, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A performance control system comprising:
  a serial information storage device that stores serial information reproducible as time passes;
  a performance information storage device that stores performance information corresponding to the serial information;
  a serial information reproducing device that reads out and reproduces the serial information stored by said serial information storage device as time passes;
  a performance information reproducing device that reads out and reproduces the performance information stored by said performance information storage device; and
  a reproduction control device that controls reproduction of the serial information by said serial information reproducing device and reproduction of the performance information by said performance information reproducing device,
  wherein the serial information comprises video information including identifying information for identifying corresponding performance information, and time information that defines a temporal position for reproduction of the corresponding performance information in association with reproduction of the serial information, and said reproduction control device provides control such that the video information is separated from the serial information during reproduction of the serial information as read out by said serial information reproducing device, and performance information in the separated video information identified by the identifying information is reproduced based on the time information in the serial information read out by said serial information reproducing device.

2. A performance control system according to claim 1, wherein the video information comprises an LTC (Longitudinal Time Code) that is an SMTPE (Society of Motion Picture and Television Engineers) time code, and the LTC includes the identifying information and the time information.

3. A performance control system according to claim 2, wherein the serial information includes an audio track for storing audio information included in the video information, and the LTC is stored in the audio track.

4. A performance control method comprising:
   a serial information reproducing step of reading out and reproducing stored serial information reproducible as time passes, as time passes;
   a performance information reproducing step of reading out and reproducing stored performance information corresponding to the serial information; and
   a reproduction control step of controlling reproduction of the serial information in said serial information reproducing step and reproduction of the performance information in said performance information reproducing step,
   wherein the serial information comprises video information including identifying information for identifying corresponding performance information, and time information that defines a temporal position for reproduction of the corresponding performance information in association with reproduction of the serial information, and said reproduction control step comprises providing control such that the video information is separated from the serial information during reproduction of the serial information as read out by said serial information reproducing step, and performance information in the separated video information identified by the identifying information is reproduced based on the time information in the serial information read out in said serial information reproducing step.

5. A computer-readable storage medium storing a program for causing a computer to execute a performance control method, the program comprising:
   a serial information reproducing module for reading out and reproducing stored serial information reproducible as time passes, as time passes;
   a performance information reproducing module for reading out and reproducing stored performance information corresponding to the serial information; and
   a reproduction control module for controlling reproduction of the serial information by said serial information reproducing module and reproduction of the performance information by said performance information reproducing module,
   wherein the serial information comprises video information including identifying information for identifying corresponding performance information, and time information that defines a temporal position for reproduction of the corresponding performance information in association with reproduction of the serial information, and said reproduction control module provides control such that the video information is separated from the serial information during reproduction of the serial information as read out by said serial information reproducing module, and performance information in the separated video information identified by the identifying information is reproduced based on the time information in the serial information read out by said serial information reproducing module.

* * * * *